(12) United States Patent
Ellison et al.

(10) Patent No.: US 9,284,662 B2
(45) Date of Patent: Mar. 15, 2016

(54) SOYBEAN BASED FIBERS

(71) Applicant: Board of Regents of the University of Texas System, Austin, TX (US)

(72) Inventors: Christopher J. Ellison, Austin, TX (US); Dustin W. Janes, Austin, TX (US)

(73) Assignee: Board of Regents of The University of Texas System, Austin, TX (US)

( * ) Notice: Subject to any disclaimer, the term of this patent is extended or adjusted under 35 U.S.C. 154(b) by 0 days.

(21) Appl. No.: 14/012,426

(22) Filed: Aug. 28, 2013

(65) Prior Publication Data

US 2014/0100351 A1   Apr. 10, 2014

Related U.S. Application Data

(60) Provisional application No. 61/694,248, filed on Sep. 21, 2012.

(51) Int. Cl.

| | | |
|---|---|---|
| *C08F 2/46* | (2006.01) | |
| *C08G 61/04* | (2006.01) | |
| *D01D 5/00* | (2006.01) | |
| *C08G 75/12* | (2006.01) | |
| *D01D 5/38* | (2006.01) | |
| *D01D 10/00* | (2006.01) | |
| *D01F 1/10* | (2006.01) | |
| *D01F 6/16* | (2006.01) | |

(52) U.S. Cl.
CPC ............ *D01D 5/0046* (2013.01); *C08G 75/12* (2013.01); *D01D 5/38* (2013.01); *D01D 10/00* (2013.01); *D01F 1/10* (2013.01); *D01F 6/16* (2013.01)

(58) Field of Classification Search
CPC ....... D01D 5/0046; D01D 10/00; D01D 5/38; D01F 6/16; D01F 1/10; C08G 75/12
USPC .................................. 522/182, 178, 1; 520/1
See application file for complete search history.

(56) References Cited

U.S. PATENT DOCUMENTS

2010/0197878 A1* 8/2010 Casati et al. .................. 526/319
2010/0215922 A1* 8/2010 Rajaraman et al. ......... 428/195.1

FOREIGN PATENT DOCUMENTS

ES        2208111      *   3/2005

OTHER PUBLICATIONS

Visa et al, ES 2208111 Machine Translation, Mar. 16, 2005.*
Chen et al, Soy-based UV curable thiol-ene coatings, 2010, J. Coat. Technol. Res., 7 (5), 603-613.*
Shibata et al, Supramolecular composites of photocured acrylated epxidized soybean oil and fibers formed by the self-assembly of low molecular weight organic gelators, Apr. 27, 2011, Polymer Journal, 43, 552-558.*

* cited by examiner

*Primary Examiner* — Ling Choi
*Assistant Examiner* — Jessica E Whiteley
(74) *Attorney, Agent, or Firm* — Meunier Carlin & Curfman LLC

(57) ABSTRACT

Fibers can be formed from monomers derived from a biorenewable source. In an embodiment, a fiber forming composition that includes a monomer or mixture of monomers with at least one monomer being derived from a biorenewable source in placed in a fiber producing device. At least a portion of the fiber forming composition is ejected through an opening of the fiber producing device. The ejected fiber forming composition is subjected to light at wavelengths sufficient to activate a reaction which causes solidification of the fiber as the fibers are ejected from the fiber producing device.

9 Claims, 9 Drawing Sheets

SOYBEAN BASED FIBERS

PRIORITY CLAIM

This application claims the benefit of U.S. Provisional Application No. 61/694,248 filed on Aug. 28, 2012.

BACKGROUND OF THE INVENTION

1. Field of the Invention

The invention generally relates to the formation of polymeric fibers from biorenewable materials.

2. Description of the Relevant Art

The vast majority of commercially produced synthetic polymers used for fiber applications are made entirely from non-renewable, petroleum-based feedstocks. By substituting these source materials with biorenewable alternatives, the dependence on finite resources is reduced; harnessing solar energy through agriculture to transform carbon dioxide into useful monomers may be a more environmentally friendly option. Because annual worldwide production of nonwoven fibers (or "nonwovens") is in the billions of kilograms, incorporating even small amounts of biorenewable materials in these products could significantly impact the allocation of non-renewable resources. Two important examples of commercially available polymers containing biorenewable materials from which fibers can be formed are poly(lactide) (PLA) and poly(trimethylene terephthalate). However, these and other preformed synthetic polymers still require heating to temperatures above their melting or glass transition temperature, and/or solvent to reduce their viscosities for processing into functional fiber products. Polymeric fibers made at least in part from biorenewable feedstocks and processed without applied heat or solvent would likely be "greener" than conventional, petroleum-derived fibers formed using heat and/or solvent.

SUMMARY OF THE INVENTION

In an embodiment, a composition for use in forming fibers, comprising a monomer derived from a biorenewable source, a polymer, a cross-linker, and a photoinitiator. The monomer may be any monomer derived from a biological source.

In an embodiment, a method of forming fibers includes placing a fiber foil ring composition in a fiber producing device, the fiber forming composition comprising a monomer derived from a biorenewable source, a polymer, a cross-linker and a photoinitiator; ejecting at least a portion of the fiber forming composition through an opening of the fiber forming device; and subject the ejected fiber forming composition to light at wavelengths sufficient to activate the photoinitiator.

The fiber producing device may be an electrospinning device, a melt blowing device, or a centrifugal spinning device. The fiber forming composition includes at least 10% by weight of a monomer derived from a biorenewable source. In some embodiments, the polymer comprises an acrylate. In some embodiments, the monomer derived from a biorenewable source comprises acrylated epoxidized soybean oil.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
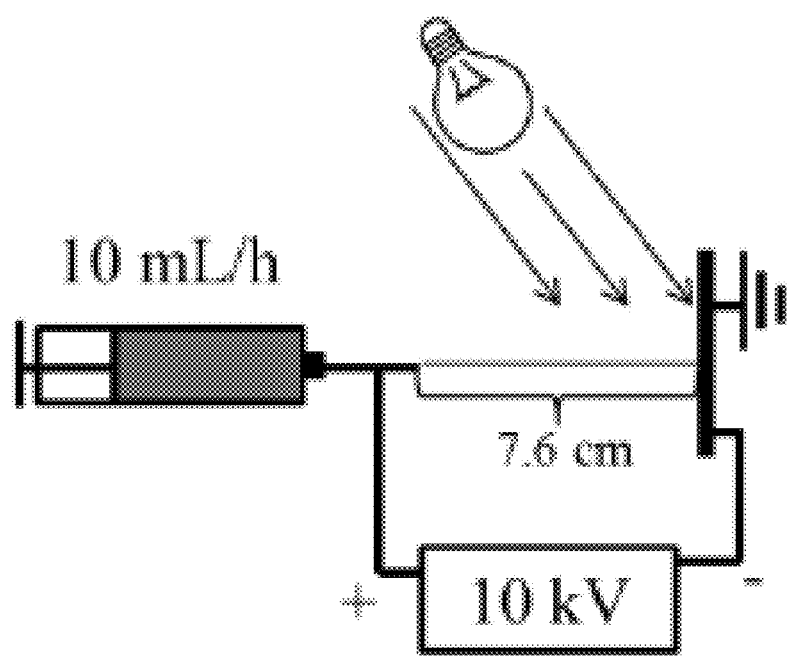
FIG. 1 depicts a schematic diagram of an electrospinning apparatus.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

This general method for the manufacture of nonwoven fibers does not use applied heat or volatile chemical solvents. A mixture of a monomer or mixture of monomers with at least one monomer being derived from a biorenewable source is ejected from a fiber producing device and photopolymerized in-situ to produce solid cross-linked fibers. The liquid composition used to make fibers was substantially nonvolatile, since all its substituents possessed very high boiling points. In one embodiment, electrospinning is used to form the fibers. Electrospinning is a fiber formation technique that uses a strong electric field to draw a fluid into a thin jet. Other techniques that may be sued to form the fibers include melt blowing (e.g., hot air jets) or centrifugal spinning. In principle, the general method of photopolymerizing liquid monomers during fiber formation is applicable to any of these processes. This approach is different than other reports where fibers are formed from preformed polymers (via melt or solution based spinning techniques) and are subsequently photocrosslinked.

Vegetable oils are one biorenewable source to which many useful chemical functionalities have been introduced to make useful alternatives to petroleum-based monomers. In the present work, the process of simultaneous photopolymerization and fiber formation is made even greener by incorporating a commercially available, biorenewable, monomer. Examples of monomers derived from a biorenewable source include, but are not limited to acrylated vegetable oil or thiol functionalized vegetable oil. For example, acrylated epoxidized soybean oil (AESO) may be used to form commercially useful fibers in place of petroleum based monomers.

In an embodiment, fibers may be formed containing over 50 wt. % AESO using electrospinning, melt-blowing or centrifugal spinning Materials used to make the fibers other than AESO included an acrylate compound, a crosslinker, and a photoinitiator.

An acrylate compound includes one or more ethylenic substituents. Acrylate compounds include, but are not limited to, $C_1$-$C_{20}$ alkyl acrylates, $C_1$-$C_{20}$ alkyl methacrylates, $C_2$-$C_{20}$ alkenyl acrylates, $C_2$-$C_{20}$ alkenyl methacrylates, $C_5$-$C_8$ cycloalkyl acrylates, $C_5$-$C_8$ cycloalkyl methacrylates, phenyl acrylates, phenyl methacrylates, phenyl($C_1$-$C_9$)alkyl acrylates, phenyl($C_1$-$C_9$)alkyl methacrylates, substituted phenyl ($C_1$-$C_9$)alkyl acrylates, substituted phenyl($C_1$-$C_9$) alkyl methacrylates, phenoxy($C_1$-$C_9$)alkyl acrylates, phenoxy($C_1$-$C_9$)alkyl methacrylates, substituted phenoxy($C_1$-$C_9$)alkyl acrylates, substituted phenoxy($C_1$-$C_9$)alkyl methacrylates, $C_1$-$C_4$ alkoxy($C_2$-$C_4$)alkyl acrylates, $C_1$-$C_4$ alkoxy ($C_2$-$C_4$)alkyl methacrylates, $C_1$-$C_4$ alkoxy($C_1$-$C_4$) alkoxy($C_2$-$C_4$)alkyl acrylates, $C_1$-$C_4$ alkoxy($C_1$-$C_4$)alkoxy

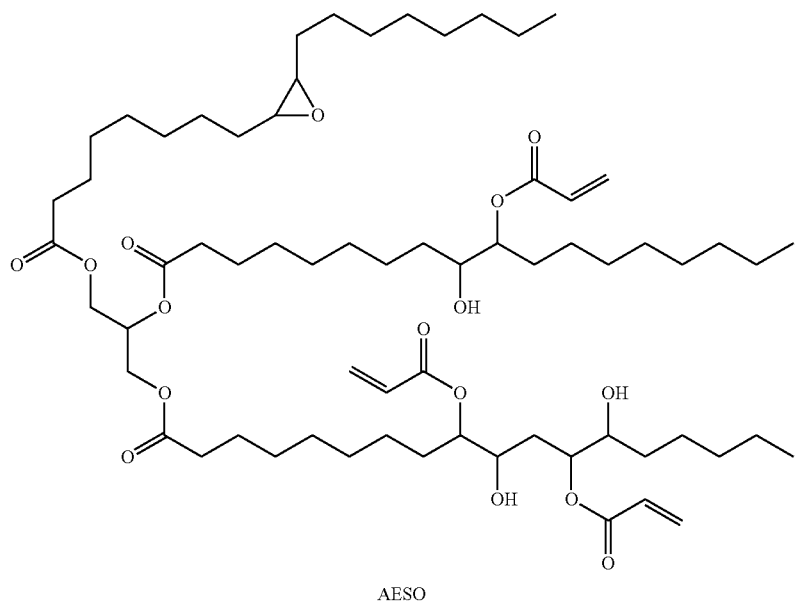 [SMILES: C=CC(=O)OC(CCCCCCCC)C(O)CCCCCCCC(=O)OC(COC(=O)CCCCCCCC(OC(=O)C=C)C(O)CC(OC(=O)C=C)C(O)CCCCC)COC(=O)CCCCCCCC1OC1CCCCCCCC]

AESO

Acrylated vegetables oils may be manufactured from vegetable oils composed of triglycerides, using known processes (see, for example, Lu et al. Polymer 2005, 46, (1), 71-80). In the process described by Lu et al., secondary alkenes present in the vegetable oil are converted to pendant acrylate groups. For example, AESO is generally acrylated as shown in order to increase the molecule's reactivity, making it a more useful monomer in radiation-cure applications. AESO can be a suitable replacement for petroleum-derived multifunctional acrylates in many applications. For example, compositions containing AESO have been explored by others as biobased alternatives to conventional sheet molding compound resins, thermosetting foams, membrane surface modifiers, UV curable inks and coatings, and solar cell electrode binders. AESO can be a suitable replacement for petroleum-derived multifunctional acrylates in many applications. For example, compositions containing AESO have been explored by others as biobased alternatives to conventional sheet molding compound resins, thermosetting foams, membrane surface modifiers, UV curable inks and coatings, and solar cell electrode binders.

($C_2$-$C_4$)alkyl methacrylates, $C_2$-$C_4$ oxiranyl acrylates, $C_2$-$C_4$ oxiranyl methacrylates, copolymerizable di-, tri- or tetraacrylate monomers, copolymerizable di-, tri-, or tetra-methacrylate monomers.

Examples of such monomers include methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, isodecyl methacrylate, ethyl acrylate, methyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, isodecyl acrylate, ethylene methacrylate, propylene methacrylate, isopropylene methacrylate, butane methacrylate, isobutylene methacrylate, hexene methacrylate, 2-ethylhexene methacrylate, nonene methacrylate, isodecene methacrylate, ethylene acrylate, propylene acrylate, isopropylene, hexene acrylate, 2-ethylhexene acrylate, nonene acrylate, isodecene acrylate, cyclopentyl methacrylate, 4-methyl cyclohexyl acrylate, benzyl methacrylate, o-bromobenzyl methacrylate, phenyl methacrylate, nonylphenyl methacrylate, benzyl acrylate, o-bromobenzyl phenyl acrylate, nonylphenyl acrylate, phenethyl methacrylate, phenoxy methacrylate, phenylpropyl methacrylate, nonylphenylethyl methacrylate, phenethyl acrylate, phenoxy acrylate, phenylpropyl acrylate, nonylphenylethyl acrylate, 2-ethoxyethoxymethyl acrylate, ethoxyethoxyethyl methacrylate, 2-ethoxyethoxymethyl acrylate, ethoxyethoxyethyl acrylate (SR-256), glycidyl methacrylate, glycidyl acrylate, 2,3-epoxybutyl methacrylate, 2,3-epoxybutyl acrylate, 3,4-epoxybutyl acrylate, 3,4-epoxybutyl methacrylate, 2,3-epoxypropyl methacrylate, 2,3-epoxypropyl acrylate 2-methoxyethyl methacrylate, 2-ethoxyethyl methacrylate, 2-butoxyethyl methacrylate, 2-methoxyethyl acrylate, 2-ethoxyethyl acrylate, 2-butoxyethyl acrylate, tetrahydrofurfuryl acrylate, tetrahydrofurfuryl methacrylate, ethoxylated bisphenol-A-dimethacrylate, ethylene glycol diacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5 pentane diol diacrylate, 2,5-dimethyl-1,6-hexane diol dimethacrylate, diethylene glycol diacrylate, polyethylene glycol (400) diacrylate (SR-344), diethylene glycol dimethacrylate (SR-231), trimethylolpropane trimethacrylate, tetraethylene glycol diacrylate (SR-306), tetraethylene glycol dimethacrylate, dipropylene glycol dimethacrylate, trimethylolpropane triacrylate (SR-351), glycerol triacrylate, glycerol trimethacrylate, pentaerythritol triacrylate, pentaerythritol dimethacrylate, pentaerythritol tetracrylate, pentaerythritol tetramethacrylate, dipentaerythritol pentaacrylate (SR-399), ethoxylated$_4$ bisphenol A dimethacrylate (SR-540), ethoxylated$_2$ bisphenol A dimethacrylate (SR-348), tris (2 hydroxyethyl) isocyanurate triacrylate (SR-368), ethoxylated$_4$ bisphenol A diacrylate (SR-601), ethoxylated$_{10}$ bisphenol A dimethacrylate (SR-480), ethoxylated$_3$ trimethylopropane triacrylate (SR-454), ethoxylated$_4$ pentaerithritol tetraacrylate (SR-494), tridecyl acrylate (SR-489), 3-(trimethoxysilyl) propyl methacrylate (PMATMS), 3-glycidoxypropyltrimethoxysilane (GMPTMS), neopentyl glycol diacrylate (SR-247), isobornyl methacrylate (SR-243), tripropylene glycol diacrylate (SR-306), aromatic monoacrylate (CN-131), vinyl containing monomers such as vinyl acetate and 1-vinyl-2 pyrrolidone, epoxy acrylates such as CN 104 and CN 120 which are commercially available from Sartomer Company, and various urethane acrylates such as CN-962, CN-964, CN-980, and CN-965 all commercially available from Sartomer Company.

Other monomers that may be present include, but are not limited to, vinyl ethers, norbornenes or thiol compounds.

Photoinitiators that may be used include α-hydroxy ketones, α-diketones, acylphosphine oxides, bis-acylphosphine oxides or mixtures thereof. Examples of photoinitiators that may be used include, but are not limited to: phenyl bis(2,4,6-trimethylbenzoyl)phenylphosphine oxide, commercially available from Ciba Additives in Tarrytown, N.Y. under the trade name of Irgacure 819; a mixture of phenyl bis(2,4,6-trimethylbenzoyl)phenylphosphine oxide and 1-hydroxycyclohexylphenyl ketone, commercially available from Ciba Additives under the trade name of Irgacure 184; a mixture of phenyl bis(2,4,6-trimethylbenzoyl)phenylphosphine oxide and 2,4,6-trimethylbenzoylphenylphosphinic acid ethyl ester, commercially available from Ciba Additives under the trade name of Irgacure 2100; 2-hydroxy-2-methyl-1-phenylpropane-1-one commercially available from Ciba Additives under the trade name of Darocur 1173; and benzophenone.

Crosslinkers may be acrylate monomers having two or more ethylenic substituents. Examples of suitable acrylate crosslinkers include, but are not limited to: ethoxylated bisphenol-A-dimethacrylate, ethylene glycol diacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5 pentane diol diacrylate, 2,5-dimethyl-1,6-hexane diol dimethacrylate, diethylene glycol diacrylate, polyethylene glycol (400) diacrylate (SR-344), diethylene glycol dimethacrylate (SR-231), trimethylolpropane trimethacrylate, tetraethylene glycol diacrylate (SR-306), tetraethylene glycol dimethacrylate, dipropylene glycol dimethacrylate, trimethylolpropane triacrylate (SR-351), glycerol triacrylate, glycerol trimethacrylate, pentaerythritol triacrylate, pentaerythritol dimethacrylate, pentaerythritol tetracrylate, pentaerythritol tetramethacrylate, dipentaerythritol pentaacrylate (SR-399), ethoxylated$_4$ bisphenol A dimethacrylate (SR-540), ethoxylated$_2$ bisphenol A dimethacrylate (SR-348), tris (2 hydroxyethyl) isocyanurate triacrylate (SR-368), ethoxylated$_4$ bisphenol A diacrylate (SR-601), ethoxylated$_{10}$ bisphenol A dimethacrylate (SR-480), ethoxylated$_3$ trimethylopropane triacrylate (SR-454), and ethoxylated$_4$ pentaerithritol tetraacrylate (SR-494).

In an embodiment, a composition includes AESO, an acrylate polymer (e.g., dipentarythritol pentaacrylate (DPPA)), a crosslinker (e.g., pentaerythritol tetrakis(3-mercaptopropionate) (PETT)), and a photoinitiator (e.g., Irgacure® 2100). AESO used in this embodiment has, on average, a molecular weight of 1138 g/mol and 2.7 acrylate groups per molecule. DPPA has 5 acrylate groups per average molecule and PETT has 4 thiol groups per molecule. We targeted a thiol to -ene ratio, r, of between 0.18 and 0.30 to ensure proper -ene photoconversion during fiber production.

The average -ene functionality, $\bar{f}_{ene}$, represents the average number of acrylate groups per -ene monomer in fiber precursor compositions containing both AESO and DPPA and is defined as $$\bar{f}_{ene} = f_{AESO} m_{AESO} + f_{DPPA}(1 - m_{AESO}). \qquad (1)$$

$f_{AESO}$ and $f_{DPPA}$ are the number of acrylate groups on an AESO or DPPA monomer, respectively. $m_{AESO}$ is the mole fraction of total -ene groups in the composition contributed by the AESO monomers.

Materials

Acrylated epoxidized soybean oil (AESO, Sigma Aldrich), pentaerythritol tetrakis(3-mercaptopropionate) (PETT, Sigma Aldrich), dipentaerythritol pentaacrylate (DPPA, Sartomer), and Irgacure® 2100 (BASF Corporation) were used as received to make photocurable monomer mixtures. We used Irgacure® 2100, a liquid photoinitiator formulation based on bis(2,4,6-trimethylbenzoyl)-phenylphosphineoxide, because its light absorption spectra overlaps with the emission spectra of our light source and it mixes easily with the other materials. Nuclear magnetic resonance (NMR) spectroscopy indicated that AESO contains 2.7 average acrylate groups per molecule, and the average molecular weight was 1138 g/mol. On average, DPPA has 5 acrylate groups per molecule and a molecular weight of 524.51 g/mol; PETT has 4 thiol groups per molecule and a molecular weight of 488.66 g/mol.

Electrospinning Methods and Conditions

Precise quantities of monomers and photoinitiator were placed in a vial and mixed by 3 minutes of stirring followed by 5 minutes of shaking by a vibratory mixer. Then the mixture was placed under vacuum (10 torr) to remove air bubbles. The sample was loaded into an opaque syringe, which was then fitted with a blunt tip, 0.8 mm inner diameter needle. Exposure of the sample to ultraviolet room light was minimized in each of these steps to limit ambient curing.

A schematic diagram of the electrospinning apparatus is shown in FIG. 1. For the experiments, the grounded collector was positioned 7.6 cm from the needle tip, from which monomers were fed at a rate of 10 mL/h. 10 kV of positive DC charge was applied to the needle tip, creating an electric field of sufficient strength to drive a jet of solution towards the grounded collector. The broadband light source, fitted with a collimating lens, was positioned about 2.5 cm from the liquid jet and angled so that it illuminated both the collected fibers and the liquid jet near the collector. At this distance, the light intensity was measured by a radiometer to be 490 mW/cm$^2$.

Scanning Electron Microscopy (SEM)

Fiber quality and the diameter distribution was measured by SEM. Fibers were cut from the photocured mat and affixed to carbon tape placed on the top of an SEM sample post. The post was then sputter-coated from an Au/Pd target to deposit a charge dissipation layer on the fiber surface. The sample was then loaded into a Hitachi S-4500 SEM operated with 10-15 kV accelerating voltage, a working distance of 14-17 mm, and a secondary electron detector. Subsequent analysis of the images using ImageJ gave the distribution of fiber diameters.

Real Time Infrared Spectroscopy (RTIR)

Infrared spectra of monomer mixtures during photo-exposure were measured using a Nicolet 6700 FT-IR spectrometer with a KBr beamsplitter and a MCT-A detector (Thermo Fisher Scientific, Waltham, Mass.). A horizontal transmission accessory (Harrick Scientific Products, Inc., Pleasantville, N.Y.) enabled measurement of supported liquid films. A polished germanium crystal disc was placed in the beam path close to the detector as a longpass filter. This prevented the broadband light used to cure the film from altering the recorded spectra. The spectrometer and horizontal transmission accessory were continuously purged with dry, $CO_2$ free air. Background scans and sample spectra were taken following 20 minutes of purging after loading the as-received NaCl crystal or sample into the spectrometer, respectively. Spectra were recorded every 0.1 s as an average of 2 scans with 8 cm$^{-1}$ resolution. Data collection and calculation of peak areas were performed using the instrument's Omnic software.

Samples were prepared by spin coating a monomer mixture on a polished, 25 mm diameter, 4 mm thick NaCl crystal (International Crystal Laboratories, Garfield, N.J.) at 2500 RPM for 1 minute. The sample was then loaded into the spectrometer. When the liquid monomer mixtures were irradiated by UV light, absorption peaks corresponding to acrylate (1652-1582 cm$^{-1}$) and thiol (2599-2540 cm$^{-1}$) quickly decreased in size. To account for any changes in sample thickness during the experiment, the area under acrylate and thiol peaks, for any given irradiation time, were self-referenced to a photochemically stable one (hydroxyl, 3643-3203 cm$^{-1}$). Conversion of acrylate or thiol groups at a given irradiation time is the decrease in self-referenced peak area from the initial self-referenced peak area, $A_t-A_0$, relative to the initial self-referenced peak area, $A_0$ (i.e. Conversion=$(A_t-A_0)/A_0$).

Characterization of AESO by Nuclear Magnetic Resonance (NMR)

Figure 2:
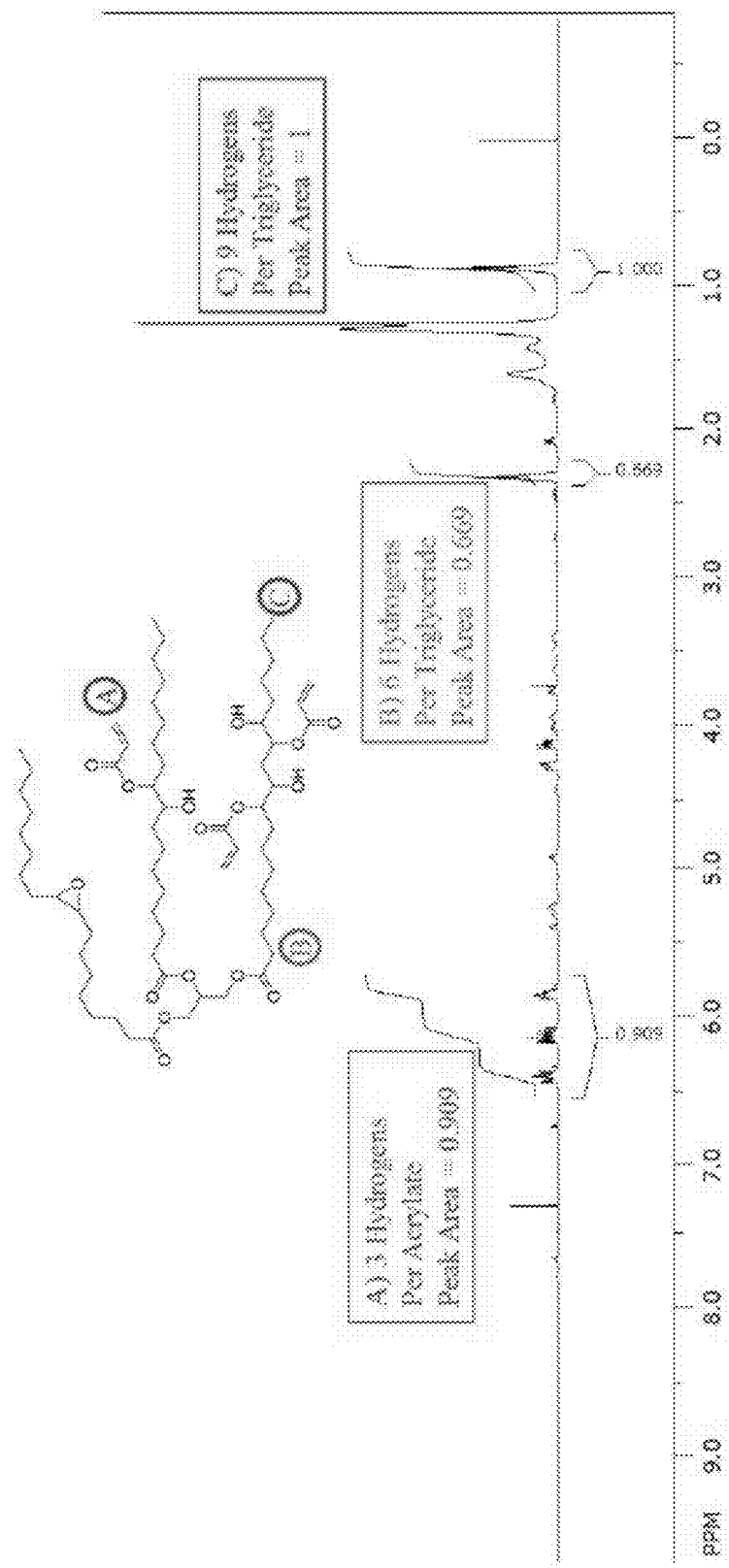
FIG. 2 depicts an NMR spectrum of acrylated epoxidized soybean oil.

The NMR spectrum of acrylated epoxidized soybean oil (Sigma Aldrich, AESO) was recorded on a Varian 400 MHz DirectDrive NMR using CDCl$_3$ (0.05 v/v % tetramethylsilane, Cambridge Isotope Laboratories) as solvent. The spectrum is shown in FIG. 2, using SpinWorks v. 3.1.8.1 for data analysis. The area under peaks corresponding to acrylate groups was compared quantitatively to two other well-defined peaks to determine the average number of acrylate groups per AESO molecule as 2.7.

Refined soybean oil is composed almost entirely of triglyceride molecules of varying fatty acid length and degree of unsaturation. Their average molecular weight is 871 g/mol and their average number of secondary alkenes is 4.6. Therefore, the molecular weight of an AESO molecule with 2.7 acrylate groups per molecule is 1138 g/mol, if all unsaturated carbons were epoxidized in the intermediate step of AESO manufacture.

Estimation of Biobased Carbon Content in Fibers

The amount of biobased carbon was calculated on the basis of fiber composition. The only source of biobased carbon is AESO, which has 56.3 biobased carbons and 8.1 non-biobased carbons per molecule, on average. The exact composition of Irgacure® 2100, which makes up 6 wt. % of the fibers, is not known. For our estimations we assumed Irgacure® 2100 had the structure of one of its known constituents, bis (2,4,6-trimethylbenzoyl)-phenylphosphineoxide.

The biobased carbon content of fibers is high because the carbon density of AESO is very high relative to other fiber components. For example, we estimate that fibers containing 51 wt. % AESO (the "good fibers" composition described in Table 1 and shown in FIG. 3) have 49% biobased carbon and the fibers containing 87 wt. % AESO (the "no DPPA" composition described in Table 1 and shown in FIG. 7 have 72% biobased carbon.

Figure 3:
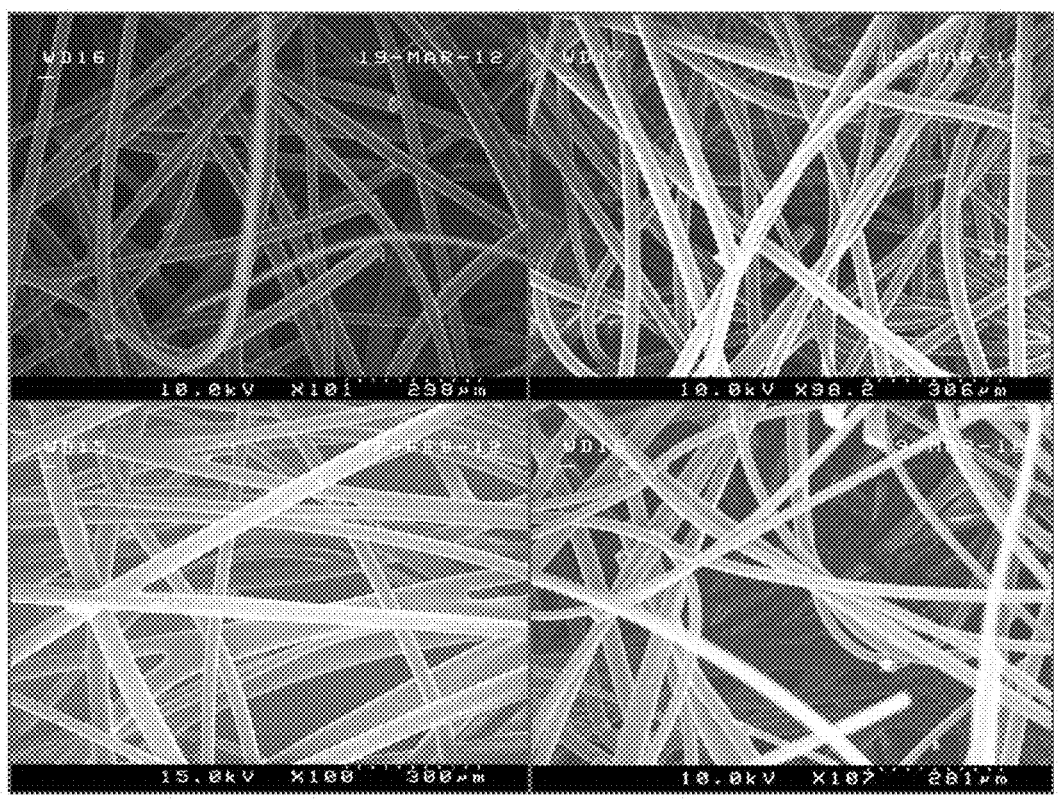
FIG. 3 shows SEM micrographs of fibers composed of, by mass, 51% AESO, 29% DPPA, 14% PETT, and 6% Irgacure® 2100.

FIG. 3 shows SEM micrographs of fibers composed of, by mass, 51% AESO, 29% DPPA, 14% PETT, and 6% Irgacure® 2100. r=0.28 and $f_{ene}$=4.3. An estimated 49% of the carbon in these fibers is biobased.

Figure 4:
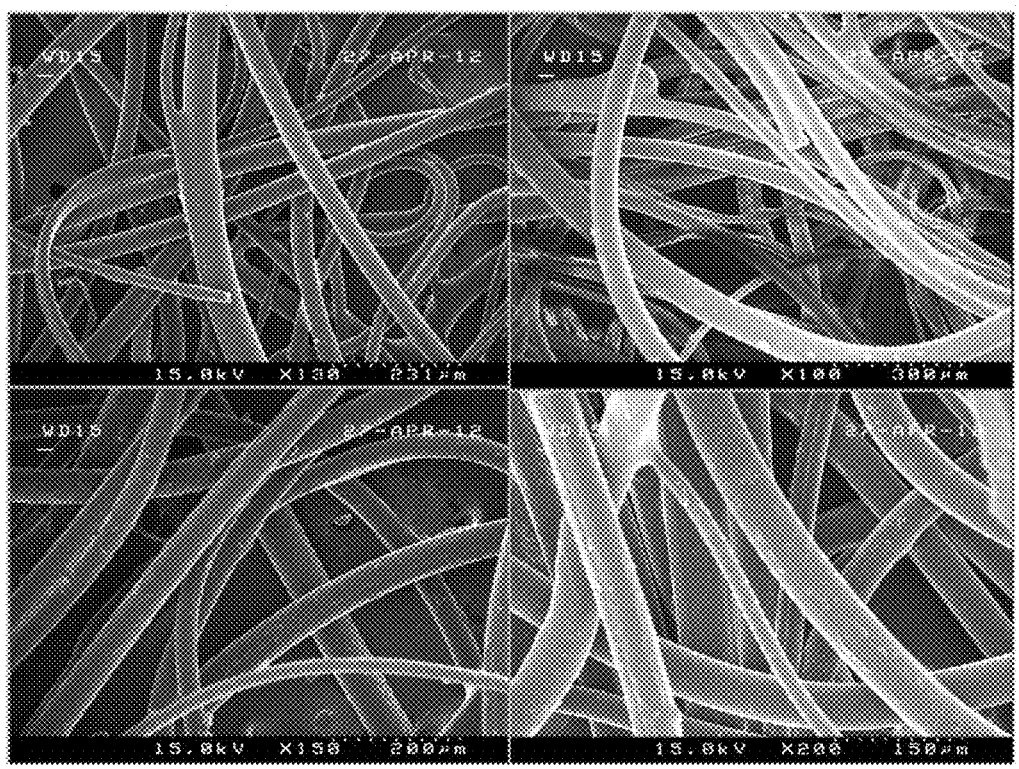
FIG. 4 shows SEM micrographs of fibers composed of, by mass, 60% AESO, 22% DPPA, 12% PETT, and 6% Irgacure® 2100.

FIG. 4 shows SEM micrographs of fibers composed of, by mass, 60% AESO, 22% DPPA, 12% PETT, and 6% Irgacure® 2100. r=0.28 and $f_{ene}$=4.1. An estimated 53% of the carbon in these fibers is biobased.

Figure 5:
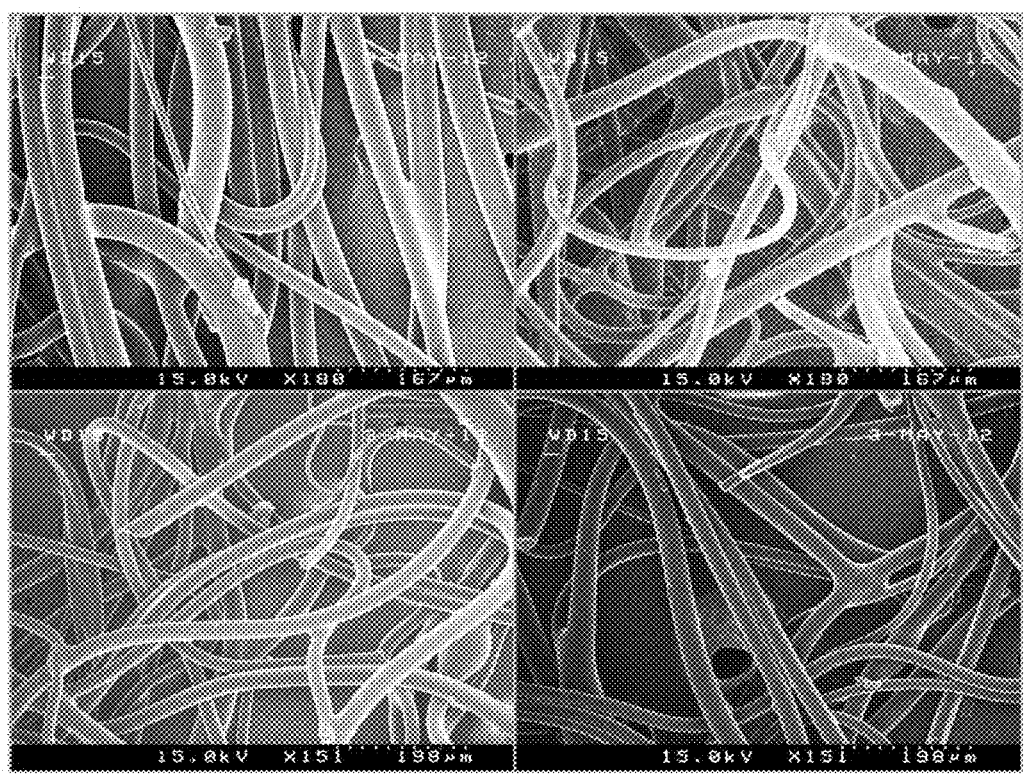
FIG. 5 shows SEM micrographs of fibers composed of, by mass, 70% AESO, 14% DPPA, 10% PETT, and 6% Irgacure® 2100.

FIG. 5 shows SEM micrographs of fibers composed of, by mass, 70% AESO, 14% DPPA, 10% PETT, and 6% Irgacure® 2100. r=0.28 and $f_{ene}$=3.7. An estimated 59% of the carbon in these fibers is biobased.

Figure 6:
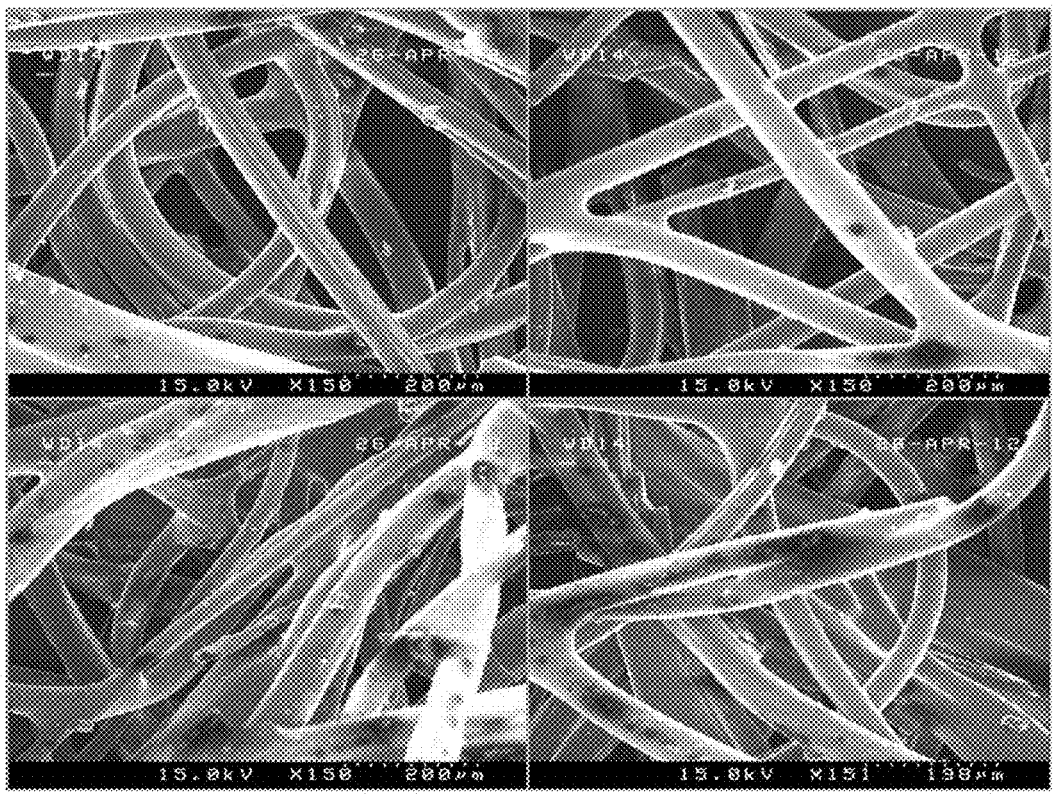
FIG. 6 shows SEM micrographs of fibers composed of, by mass, 80% AESO, 6% DPPA, 8% PETT, and 6% Irgacure® 2100.

FIG. 6 shows SEM micrographs of fibers composed of, by mass, 80% AESO, 6% DPPA, 8% PETT, and 6% Irgacure® 2100. r=0.28 and $f_{ene}$=3.2. An estimated 65% of the carbon in these fibers is biobased.

Figure 7:
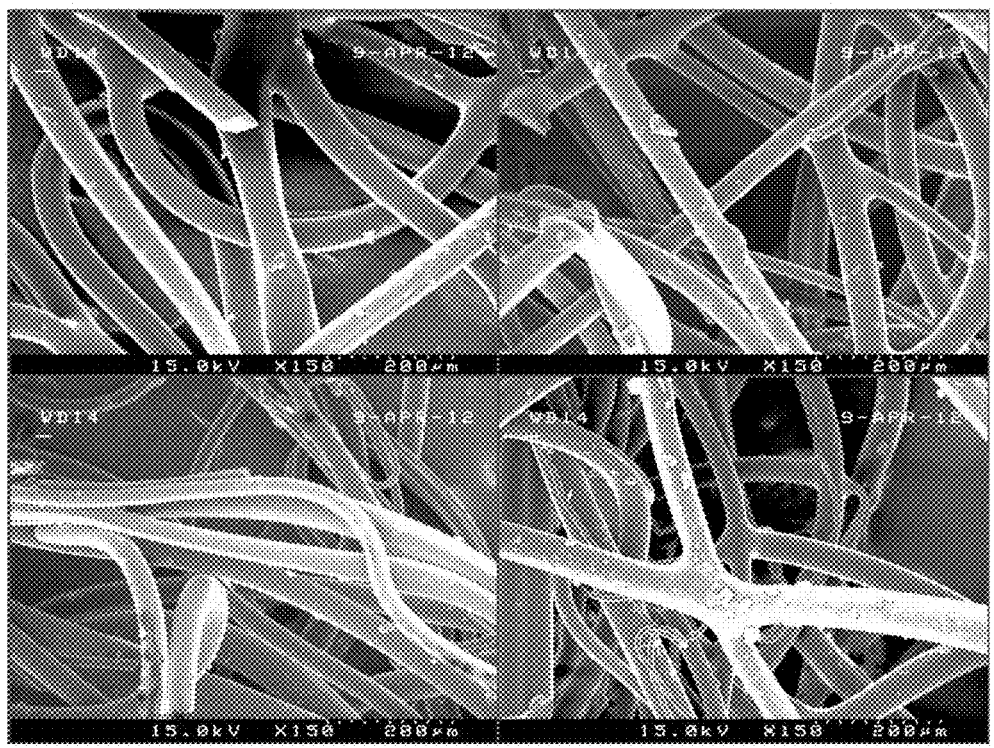
FIG. 7 shows SEM micrographs of fibers composed of, by mass, 87% AESO, 7% PETT, and 6% Irgacure® 2100.

FIG. 7 shows SEM micrographs of fibers composed of, by mass, 87% AESO, 7% PETT, and 6% Irgacure® 2100. r=0.28 and $f_{ene}$=2.7. An estimated 72% of the carbon in these fibers is biobased.

Discussion

Figure 8:
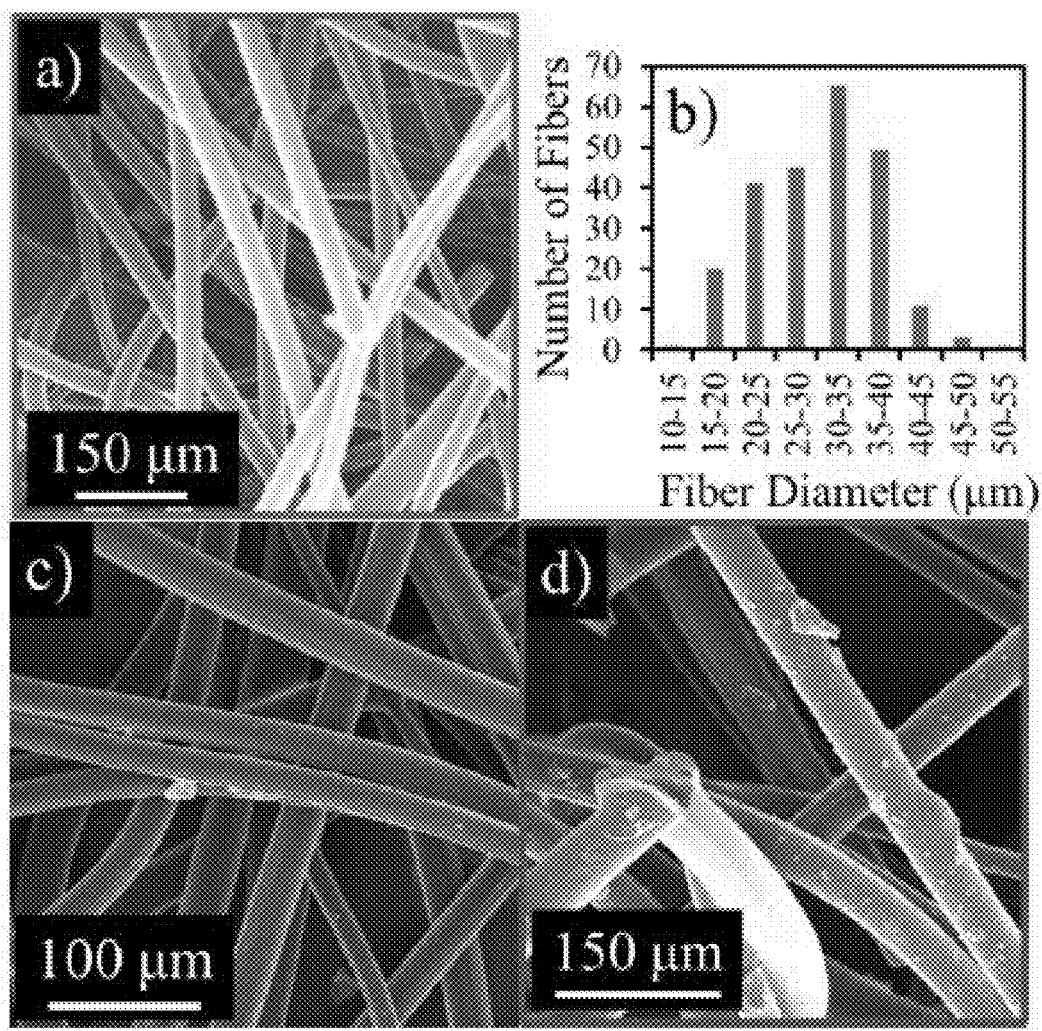
FIG. 8A depicts a representative micrograph of fibers produced from the composition of Table 1.
FIG. 8B depicts a diameter distribution of fibers produced from the composition of Table 1.
FIG. 8C depicts a representative SEM micrograph of the fibers produced from the composition of Table 1 after toluene soaking.
FIG. 8D depicts a representative SEM of fibers made when DPPA is omitted entirely from the composition of Table 1.

A composition that could be reproducibly electrospun and photocured into solid fibers is described in Table 1 and referred to throughout the text as "good fibers". In this monomer mixture an estimated 49% of the carbon is biobased. A representative micrograph of these fibers taken by scanning electron microscopy (SEM) is shown in FIG. 8A. The fibers have a smooth surface without wrinkles or beads, and relatively few fused junctions where fibers have become attached to one another prior to being completely cured. The diameter distribution of these fibers was taken from 236 diameter measurements, and is shown in FIG. 8B. The mean fiber diameter is 30 μm, with a standard deviation of 7 μm.

TABLE 1

Summary of compositions used in FIGS. 2 and 3.

| Composition Name and Representative SEM | % composition, by mass | | | | r | $\bar{f}_{ene}$ (Eq. S1) |
|---|---|---|---|---|---|---|
| | AESO | DPPA | PETT | Irgacure ® 2100 | | |
| good fibers, FIG. 2a | 51 | 29 | 14 | 6 | 0.28 | 4.3 |
| no PETT | 59 | 34 | 0 | 6 | 0 | 4.3 |
| no DPPA, FIG. 2d | 87 | 0 | 7 | 6 | 0.28 | 2.7 |

The thermochemical stability of the fibers containing 51% AESO was explored by soaking fibers in hot toluene. The as-spun fiber mats were placed in 75° C. toluene, removed after 5 hours, and then dried under vacuum. Toluene readily dissolves all of the substituents used to make the fibers, but not the final cross-linked fibers. A representative SEM micrograph of the fibers after toluene soaking is shown in FIG. 8C. The fibers retain their shape, and no new features such as wrinkling or cracking develop on the surface.

Fibers with higher biorenewable content than the composition in FIG. 8A were also made. These compositions retained r=0.28 and the same photoinitiator content as above, but higher AESO content, and lower DPPA and PETT content. However, fibers made from the compositions with higher biorenewable content appeared to have more defects, and less overall fibers were made in a given electrospinning run. The compositions that did not make as many fibers exhibited some fibers were not fully cured when they reached the collector, at which point the fluid coalesced. This could be easily remedied by implementing a more intense light source. A representative SEM micrograph of fibers made when DPPA is omitted entirely from the composition is shown in FIG. 8D (i.e., -ene component is 100% AESO). This composition is described in Table 1 and referred to in the text as "no DPPA", and contains about 72% biobased carbon. The surface of many of these fibers is not smooth and contains small defects. Additionally, more fused fiber junctions are present. These features in FIG. 8D are phenomenologically consistent with a slower rate of photocuring compared to compositions used to generate the highest quality fibers shown in FIG. 8A.

Figure 9:
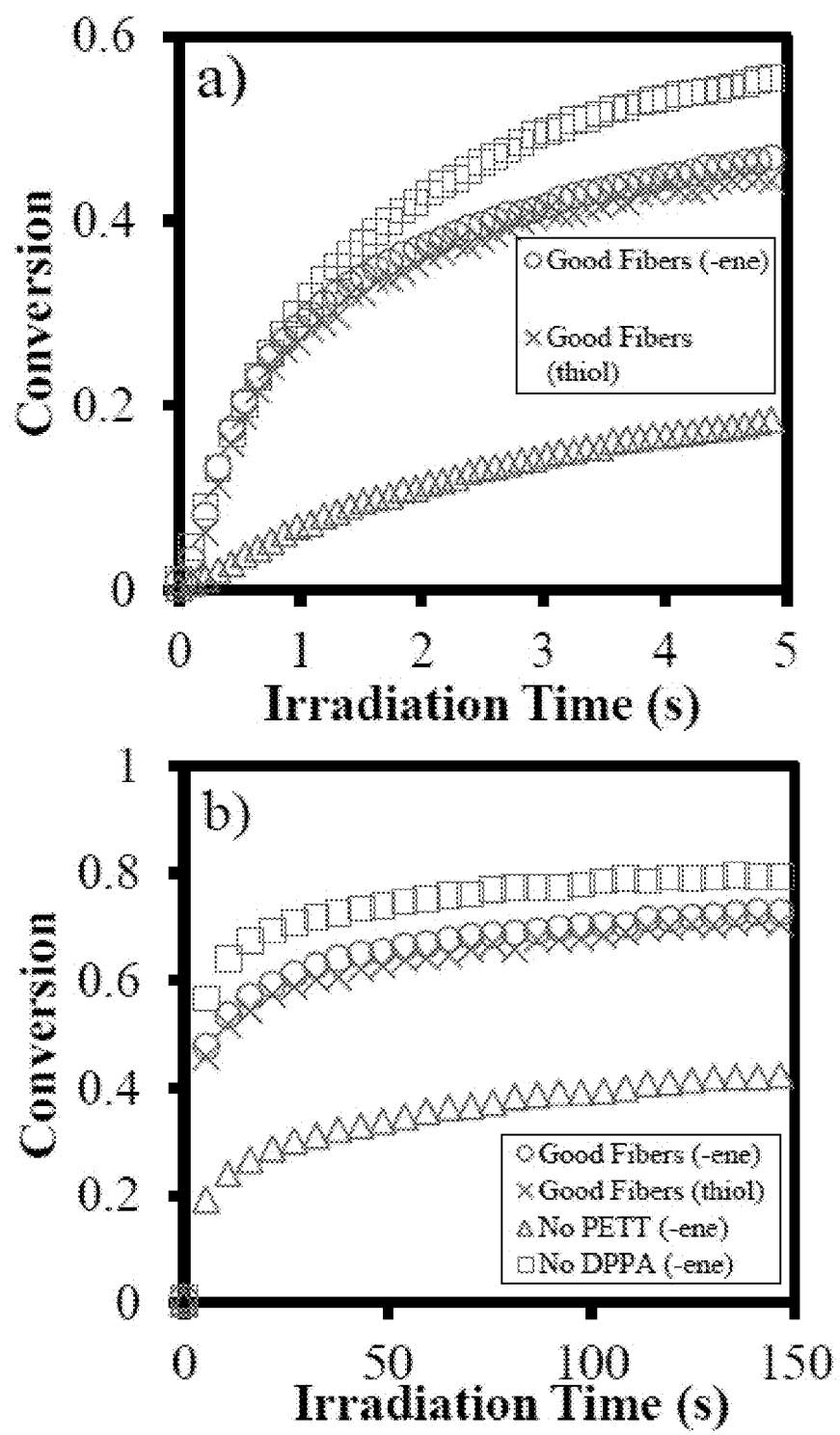
FIG. 9A depicts the conversion of chemical groups at short irradiation times.
FIG. 9B depicts the conversion of chemical groups at radiation times of up to 150 s.

To gain greater insight into the factors influencing photocuring speed and fiber formation, real-time Fourier transform infrared spectroscopy (RTIR) was performed on three different monomer compositions. The results showing conversion of chemical groups at short irradiation times (<5 s) are shown in FIG. 9A. This timescale is useful for fiber formation because the fluid jet can break into droplets if it is not photocured extremely quickly. Additionally, RTIR data extending to 150 s are shown in FIG. 9B. The mixtures are described in terms of composition and reaction stoichiometry in Table 1 and listed according to the data labels used in the legend of FIG. 9.

The data representing the "good fibers" composition is described first. The photoconversion of thiol and -ene groups increases rapidly in the early stages of irradiation, and the photo-conversions of thiol and -ene groups in this composition proceed at nearly identical rates. At any given irradiation time the conversion of -enes is no more than 4% higher than that of thiol groups. Note that since the monomer composition contains a 3.5 fold excess of -ene groups relative to thiols, this means that acrylates are homopolymerizing at a faster rate than they are reacting with thiol groups.

To demonstrate the necessity of thiol-ene chemistry for this application, the photoconversion of -ene groups for a mixture that omits PETT was measured, called "no PETT", yet has the same $\bar{f}_{ene}$ and photoinitiator content as the "good fibers" composition. Without a thiol component, the polymerization is oxygen inhibited and the photoconversion rate is greatly suppressed.

The photoconversion kinetics of the "no DPPA" composition were also measured, which retains the same r and photoinitiator content as the "good fibers" composition. The photoconversion of the "no DPPA" composition is actually as fast as that of the "good fibers" composition for the first 0.7 s of irradiation, and for any given time after that the conversion of the "no DPPA" composition is higher than the "good fibers" composition. Initially, this may appear incompatible with our previous observation that higher quality fibers are made with a composition containing both AESO and DPPA as -ene components than a composition that omits DPPA entirely (see FIGS. 2a and 2d). However, since $\bar{f}_{ene}$ is considerably lower for the "no DPPA" composition, any prediction of the gel point will undoubtedly be higher, and the irradiation time needed to form a gel will be correspondingly longer.

To quantitatively estimate the impact of $\bar{f}_{ene}$ on the irradiation time necessary to photo-crosslink the fiber precursors, $t_\alpha$, the gelation theory of Bowman and coworkers [Reddy, S. K.; Okay, O.; Bowman, C. N. Macromolecules 2006, 39, (25), 8832-8843] was applied to the RTIR data for the "good fibers" and "no DPPA" compositions. Their predictive expressions for the critical conversion to reach a gel, $p_\alpha$, in thiol-acrylate polymerizations (Eq. 38 in Bowman) are simplified by neglecting termination and cyclization effects and setting the conversion of -ene groups equal to the conversion of thiol groups, as justified by the data in FIG. 3. $p_\alpha$ then found by solving $$\frac{2}{r}(\bar{f}_{ene}-1)\frac{k_{pCC}}{k_{CT}}p_\alpha + (f_{SH}-1)(\bar{f}_{ene}-1)\left(1+\frac{1}{r}\frac{k_{pCC}}{k_{CT}}\right)p_\alpha^2 = 1 \quad (2)$$

Here, $$\frac{k_{pCC}}{k_{CT}} = 1.5$$

is the ratio of propagation to chain transfer kinetic parameters for thiol-acrylate systems[33] and $f_{SH}$ is the number of thiol groups per PETT monomer. Eq. 2 predicts $p_\alpha$=2.7% for the "good fibers" composition and $p_\alpha$=5.0% for the "no DPPA" composition. Using these values of $p_\alpha$ to extract $t_\alpha$ from RTIR data by interpolation yields $t_\alpha$=61 ms for the "good fibers" composition and $t_\alpha$=132 ms for the "no DPPA" composition. While higher conversions than the values of $p_\alpha$ predicted by Eq. 2 are undoubtedly necessary to lower the sol fraction and obtain high quality fibers, the RTIR data suggests that the "no DPPA" composition cures about twice as slow as the "good fibers" composition and is indeed consistent with the latter yielding higher quality fibers.

In summary, chemically stable fibers containing over 50 wt. % of AESO, with an average diameter of 30 μm, can be made by photopolymerizing a monomer composition during the fiber formation process. It is estimated that fibers with 51 wt. % AESO have about 49% biobased carbon. This process can be viewed as replacing the thermal energy needed for melt processing with light energy. It is worth noting that, while the amount of thermal energy needed to render a given thermoplastic processable is related to thermodynamic constants such as the heat of melting, opportunity exists to improve the energy efficiency of this photocuring-based process. By precisely tuning the light source emission spectra to the photoinitiator absorption spectra, and photocuring many monomer jets in the same irradiation area, this process could be made more energy efficient.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A fiber producing composition, comprising:
   a mixture of monomers, wherein at least one monomer is derived from vegetable oil and one or more monomers are derived from a petroleum source;
   and a photoinitiator; and wherein the composition comprises at least 50% by weight of the monomer derived from vegetable oil.

2. The composition of claim 1, wherein the monomer derived from vegetable oil is an acrylated vegetable oil.

3. The composition of claim 1, wherein the monomer derived from vegetable oil comprises acrylated epoxidized soybean oil.

4. The composition of claim 1, wherein the monomer derived from vegetable oil comprises thiol functionalized soybean oil.

5. The composition of claim 1, further comprising a crosslinker.

6. The composition of claim 1, further comprising rheology modifiers or preformed polymers.

7. The composition of claim 1, further comprising one or more solvents.

8. The composition of claim 1, wherein the monomers that are derived from a petroleum source comprise one or more acrylate compounds.

9. The composition of claim 1, wherein the monomer derived from vegetable oil is an acrylated epoxidized soybean oil and the monomer that is derived from a petroleum source is dipentaerythritol pentaacrylate.

* * * * *